(12) United States Patent
Kontermann et al.

(10) Patent No.: US 11,919,380 B2
(45) Date of Patent: Mar. 5, 2024

(54) DRIVABLE AXLE FOR A VEHICLE

(71) Applicant: ZF Friedrichshafen AG, Friedrichshafen (DE)

(72) Inventors: Peter Kontermann, Osnabrück (DE); Benjamin Bäumer, Ibbenbüren (DE)

(73) Assignee: ZF Friedrichshafen AG, Friedrichshafen (DE)

(*) Notice: Subject to any disclaimer, the term of this patent is extended or adjusted under 35 U.S.C. 154(b) by 372 days.

(21) Appl. No.: 17/264,561

(22) PCT Filed: Jul. 10, 2019

(86) PCT No.: PCT/EP2019/068469
§ 371 (c)(1),
(2) Date: Jan. 29, 2021

(87) PCT Pub. No.: WO2020/035227
PCT Pub. Date: Feb. 20, 2020

(65) Prior Publication Data
US 2021/0323393 A1 Oct. 21, 2021

(30) Foreign Application Priority Data

Aug. 14, 2018 (DE) ...................... 10 2018 213 651.3

(51) Int. Cl.
*B60K 1/00* (2006.01)
*B60G 11/02* (2006.01)
(52) U.S. Cl.
CPC ................ *B60K 1/00* (2013.01); *B60G 11/02* (2013.01); *B60G 2202/11* (2013.01); *B60K 2001/001* (2013.01)

(58) Field of Classification Search
CPC .... B60K 1/00; B60K 2001/001; B60G 11/02; B60G 2202/11
See application file for complete search history.

(56) References Cited

U.S. PATENT DOCUMENTS

| 1,500,160 A | * | 7/1924 | Stoppenbach | ........... B60K 1/00 180/57 |
| 3,693,745 A | * | 9/1972 | Petrov | ..................... B60K 1/00 310/67 R |

(Continued)

FOREIGN PATENT DOCUMENTS

| CN | 201 613 819 U | 10/2010 |
| DE | 665 984 | 10/1938 |

(Continued)

OTHER PUBLICATIONS

German Action Corresponding to 10 2018 213 651.3 dated May 29, 2019.

(Continued)

*Primary Examiner* — Erez Gurari
(74) *Attorney, Agent, or Firm* — Finch & Maloney PLLC

(57) ABSTRACT

A drivable axle for a vehicle, in particular a rigid axle. The drivable axle has an axle body designed to accommodate an axle shaft and a receiving structure for receiving a vehicle element which is integrated into a drive-train of the vehicle. The receiving structure is connected to the axle body and is designed to receive a drive unit of the vehicle and has openings for connection to the axle shaft. The receiving structure has at least one fixing area for fixing the drive unit to the receiving structure.

17 Claims, 4 Drawing Sheets

(56) References Cited

U.S. PATENT DOCUMENTS

| | | | | |
|---|---|---|---|---|
| 4,697,660 | A * | 10/1987 | Wu | B60K 1/00 |
| | | | | 180/297 |
| 4,821,827 | A * | 4/1989 | Reese | B60K 5/12 |
| | | | | 180/312 |
| 9,453,568 | B2 * | 9/2016 | Anetzberger | F16H 48/38 |
| 9,550,414 | B2 * | 1/2017 | Kudo | B60B 27/0015 |
| 2013/0019707 | A1 * | 1/2013 | Ebihara | F16H 57/0457 |
| | | | | 74/468 |
| 2018/0022390 | A1 * | 1/2018 | Cai | B60K 17/165 |
| | | | | 180/252 |
| 2019/0118649 | A1 * | 4/2019 | Han | B60K 17/24 |
| 2019/0283517 | A1 * | 9/2019 | Battaglia | B60G 17/02 |
| 2020/0384806 | A1 * | 12/2020 | Falls | B60K 17/046 |
| 2020/0391797 | A1 * | 12/2020 | Viereck | B60K 1/00 |
| 2021/0229493 | A1 * | 7/2021 | Kontermann | B62D 5/0445 |
| 2021/0323393 | A1 * | 10/2021 | Kontermann | B60K 1/00 |
| 2022/0048569 | A1 * | 2/2022 | Hair | B62D 27/02 |
| 2022/0348065 | A1 * | 11/2022 | Harmon | B62D 27/065 |

FOREIGN PATENT DOCUMENTS

| | | |
|---|---|---|
| DE | 20 2004 016 348 U1 | 1/2005 |
| DE | 103 50 862 A1 | 6/2005 |
| DE | 20 2010 001 318 U1 | 6/2011 |
| DE | 10 2013 217 590 A1 | 3/2015 |
| DE | 11 2013 003 270 T5 | 4/2015 |
| DE | 10 2014 205 135 A1 | 9/2015 |

OTHER PUBLICATIONS

International Search Report Corresponding to PCT/EP2019/068469 dated Oct. 9, 2019.
Written Opinion Corresponding to PCT/EP2019/068469 dated Oct. 9, 2019.

* cited by examiner

DRIVABLE AXLE FOR A VEHICLE

This application is a National Stage completion of PCT/EP2019/068469 filed Jul. 10, 2019, which claims priority from German patent application serial no. 10 2018 213 651.3 filed Aug. 14, 2018.

FIELD OF THE INVENTION

The invention relates to a drivable axle for a vehicle, in particular a rigid axle.

Furthermore, the invention relates to a drive unit for a vehicle.

BACKGROUND OF THE INVENTION

Although the present invention can in general be used for axles of any type, the present invention is explained with reference to a rigid axle.

Pickups and all-terrain vehicles in particular, but also large and small transporters, frequently these days have a driven rigid axle as the rear axle. In that case the two wheels are connected solidly to one another by way of an axle body of the rigid axle. In addition it has become known to integrate part of the drive-train in the rigid axles, among other things a differential and driveshafts.

From DE 10 2013 217 590 A1 a drivable axle for a motor vehicle has become known, wherein the axle comprises a differential gear system, at least one transmission bearing, at least one axle tube and at least one axle shaft, wherein the differential gear system has a separate volume from the at least one axle tube for lubricant. In this case the differential gear system is sealed relative to the at least one axle tube with the help of a gap seal.

A disadvantage of this is that the drive-train of such vehicles with rigid axles takes up a great deal of fitting space in total from the front of the vehicle to the rear. As a rule the drive-train consists of an internal combustion engine with a transmission flanged on it at the front end and the rigid axle at the rear, with a rear axle gear system or differential, which are connected to one another by a cardan shaft. The cardan shaft extends from the front end to the rear axle gear system along the longitudinal axis of the vehicle.

SUMMARY OF THE INVENTION

A purpose of the present invention is therefore to provide a drivable axle which reduces the overall fitting space required for the drive mechanism of a vehicle, which is simple to integrate and to produce, and which is inexpensive. A further objective of the present invention is to provide an alternative drivable axle.

The present invention achieves the objectives with a drivable axle for a motor vehicle, in particular a rigid axle, which comprises an axle body designed to receive an axle shaft and a receiving structure for receiving a vehicle element for integration into a drive-train, wherein the receiving structure is connected to the axle body, in that the receiving structure is designed to receive a drive unit of the vehicle and has openings for connection to the axle shaft, and the receiving structure has at least one fixing area for fixing the drive unit onto the receiving structure.

The present invention also achieves the objectives with a drive unit for a vehicle, which comprises a drivable axle according to any of the claims and a drive unit, in particular an electric motor, which is connected to the receiving structure of the drivable axle for driving the vehicle.

One of the advantages achieved thereby is that in a simple and inexpensive manner a vehicle element in the form of a drive unit can be arranged directly in the area of or with the drivable axle. An elaborate and costly connection between a drive unit at the front end and the rigid axle at the rear of a vehicle is thereby avoided. This not only saves costs, but also fitting space. Moreover, the overall weight of the vehicle is substantially reduced, which increases its range.

Further features, advantages and further embodiments of the invention are described below or disclosed thereby.

According to an advantageous further development, the receiving structure is arranged essentially symmetrically relative to the axle body. In that way an advantageous weight distribution on the drivable axle can be achieved.

According to a further advantageous further development, the receiving structure is connected to the axle body with interlock and/or in a material-merged manner, in particular welded or pressed. This makes possible a particularly reliable and at the same time simple connection of the receiving structure to the axle body.

In a further advantageous further development, the fixing area comprises at least one damping element. By virtue of the at least one damping element undesired oscillations can be damped. Thus for example, rubber mountings can be used as damping elements in order to avoid unwanted noise emission.

According to another advantageous further development, a fixing element can be provided for the additional interlocked connection of the receiving structure and the drive unit, in order to create a closed power flow from the drive unit to the axle shaft. This ensures a particularly reliable power flow from the drive unit to the axle shaft for driving the vehicle.

In another advantageous further development, the fixing element is made in the form of an in particular U-shaped bracket. This enables simple and secure fixing of the drive unit into the receiving structure and at the same time creates a reliable power flow from the drive unit to an axle shaft.

In another advantageous further development the fixing element can be connected detachably to the receiving structure. In that way a simple arrangement of the fixing element is made possible. For example, if the drive unit requires maintenance, the fixing element can be removed in a simple manner in order to allow the drive unit as a whole to be removed.

According to a further advantageous further development, the receiving structure is essentially of trough-shaped form. Besides being easy to produce, the trough-shape or U-shape also enables the drive unit to be accommodated in a simple manner. Moreover, the receiving structure can be made as a three-sided cage.

In a further advantageous further development the drivable axle comprises a spring device, in particular in the form of one or more leaf springs, for the sprung suspension of the vehicle. In that way a suspension for the drivable axle can be provided in a simple manner, which can then in particular be integrated in the vehicle as a complete assembly.

According to a further advantageous further development, the receiving structure is designed to accommodate an electric motor. Then, the electric motor can be arranged in and fixed to the receiving structure in a particularly simple manner with regard to its energy supply, wiring, etc.

In a further advantageous further development, the fixing area comprises at least one screwing element for screwing the drive unit to the receiving structure. This provides a particularly simple way to produce a detachable connection between the receiving structure and the drive unit. For maintenance purposes the drive unit can then be removed from the receiving structure in a very short time for repair or suchlike, and after a successful repair, it can easily be fitted and fixed again.

According to another advantageous further development, the receiving structure comprises at least one stiffening element, in particular a plurality of stiffening ribs. Overall, this makes for a saving of material and thus weight, while at the same time ensuring sufficient stability of the receiving structure for accommodating the drive unit.

According to a further advantageous further development, the stiffening ribs extend both parallel to the axle body and also perpendicularly thereto, in particular essentially in the shape of a star. This creates a particularly stable and at the same time low-weight receiving structure. The stiffening ribs can in particular be of convex shape.

Further important features and advantages of the invention emerge from the subordinate claims, from the drawings and from the associated figure descriptions relating to the drawings.

It is understood that the features mentioned above and those still to be explained below can be used not only in the combination indicated in each case, but also in other combinations or as stand-alone features, without going beyond the scope of the present invention.

Preferred designs and embodiments of the invention are illustrated in the drawings and will be explained in greater detail in the description below, wherein the same indexes refer to the same, or similar, or functionally equivalent components or elements.

DETAILED DESCRIPTION OF THE PREFERRED EMBODIMENTS

Figure 1:
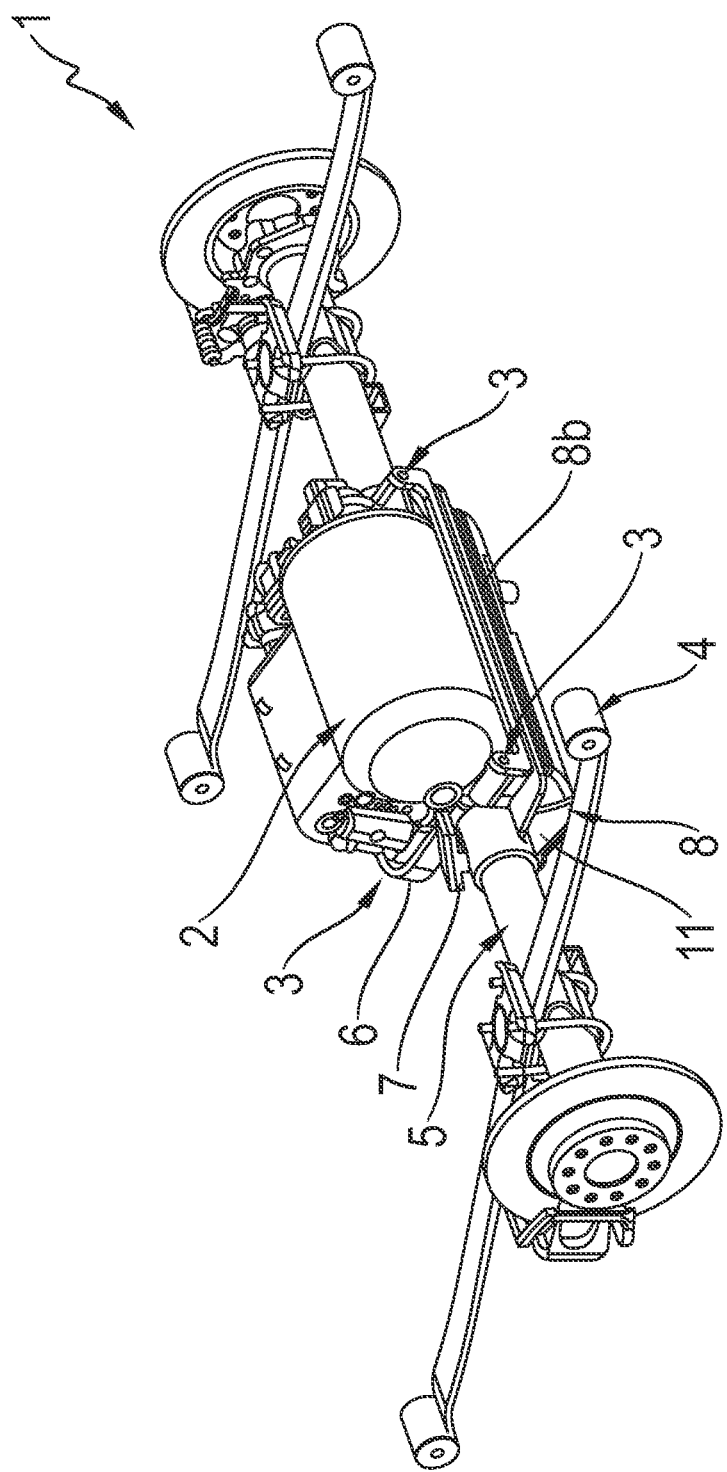
FIG. 1: A drivable axle with a drive unit according to an embodiment of the present invention.
Figure 2:
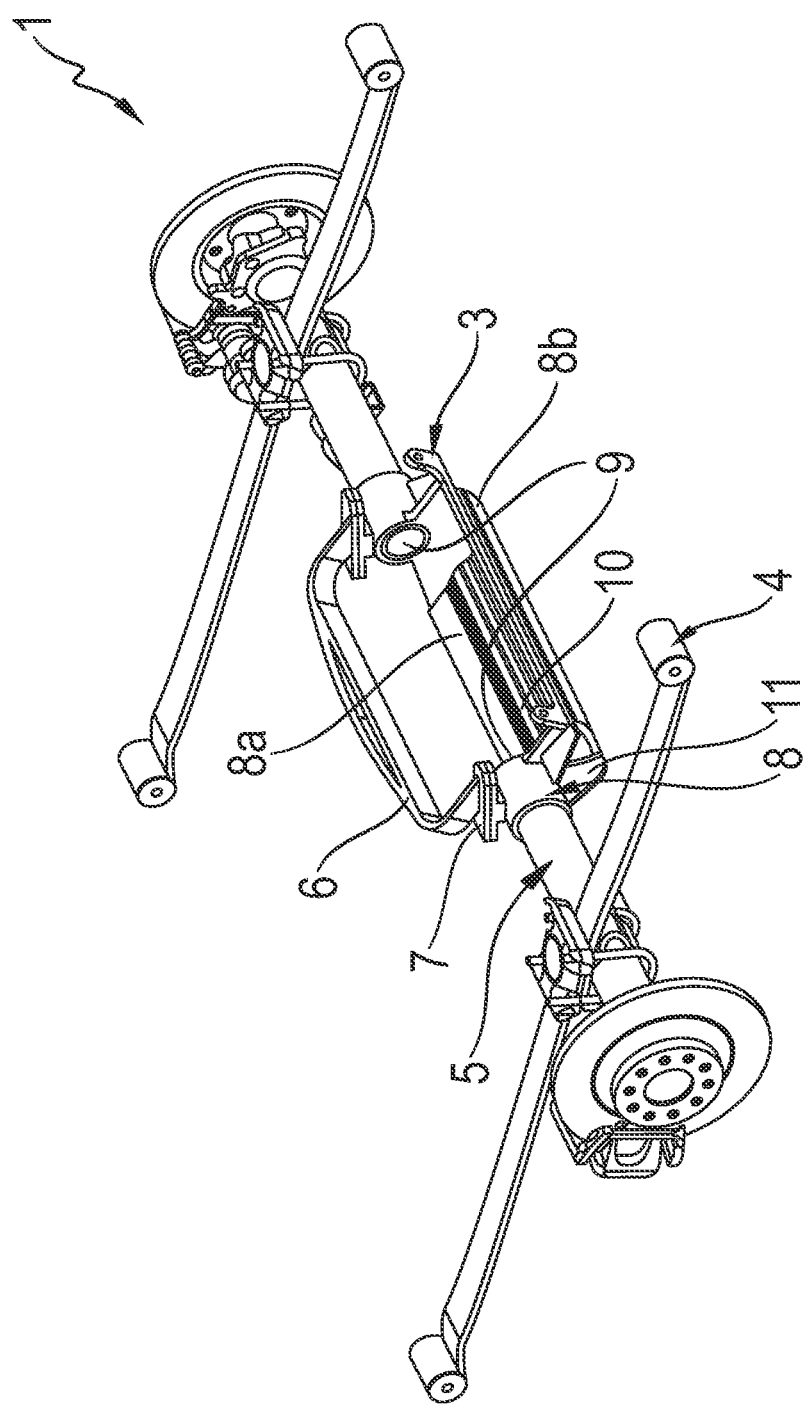
FIG. 2: The drivable axle according to FIG. 1 without its drive unit.

FIG. 1 shows a drivable axle with a drive unit, according to an embodiment of the present invention, and FIG. 2 shows the drivable axle according to FIG. 1 without the drive unit in FIG. 1.

In detail, FIGS. 1 and 2 show a drivable axle 1 in the form of a rigid axle. The drivable axle 1 in this case comprises a two-part axle body 5 which is made as a hollow cylinder. In the middle of the two-part axle body 5 is arranged a trough-shaped, supporting receiving structure 8, which serves to accommodate an electric motor 2. The electric motor 2 is connected by screwing areas 3 to the receiving structure 8. Furthermore, a U-shaped bracket 6 tilted relative to the receiving structure 8 is provided, which once the electric motor 2 has been fixed in the receiving structure 8, is also fixed by means of a screw joint 7 and provides added security for the electric motor 2. By virtue of the bracket 6, on the one hand a closed power flow from the electric motor 2 to an axle shaft in the axle body 5 and a maximum resistance torque can be ensured. For noise-damping purposes, damping elements 10 such as rubber elements can be arranged on the screwing areas 3.

On its outside, the receiving structure 8 also comprises stiffening ribs 11, which in the area of the transition between the axle body 5 and the receiving structure 8 extend in a star shape, i.e. radially outward, and which in the area of the extension of the receiving structure 8 parallel to the extension direction of the axle body 5 also run parallel to the latter. The receiving structure 8 itself has inside it on the respective ends, i.e. on the sides where the receiving structure 8 is connected to the axle body 5, openings 9 that correspond to openings of the axle body 5. Through these a connection of the electric motor 2 and an axle shaft arranged in the axle body 5 for driving the vehicle is made possible.

Furthermore, the drivable axle 1 has leaf springs 4, which are arranged perpendicularly to the extension direction of the axle body 5. These springs are then connected to the body of the vehicle. Alternatively, multi-link guiding of the drivable axle 1 is also possible. Likewise, the drivable axle 1 can be provided with a Panhard rod and a longitudinal control arm.

Figure 3:
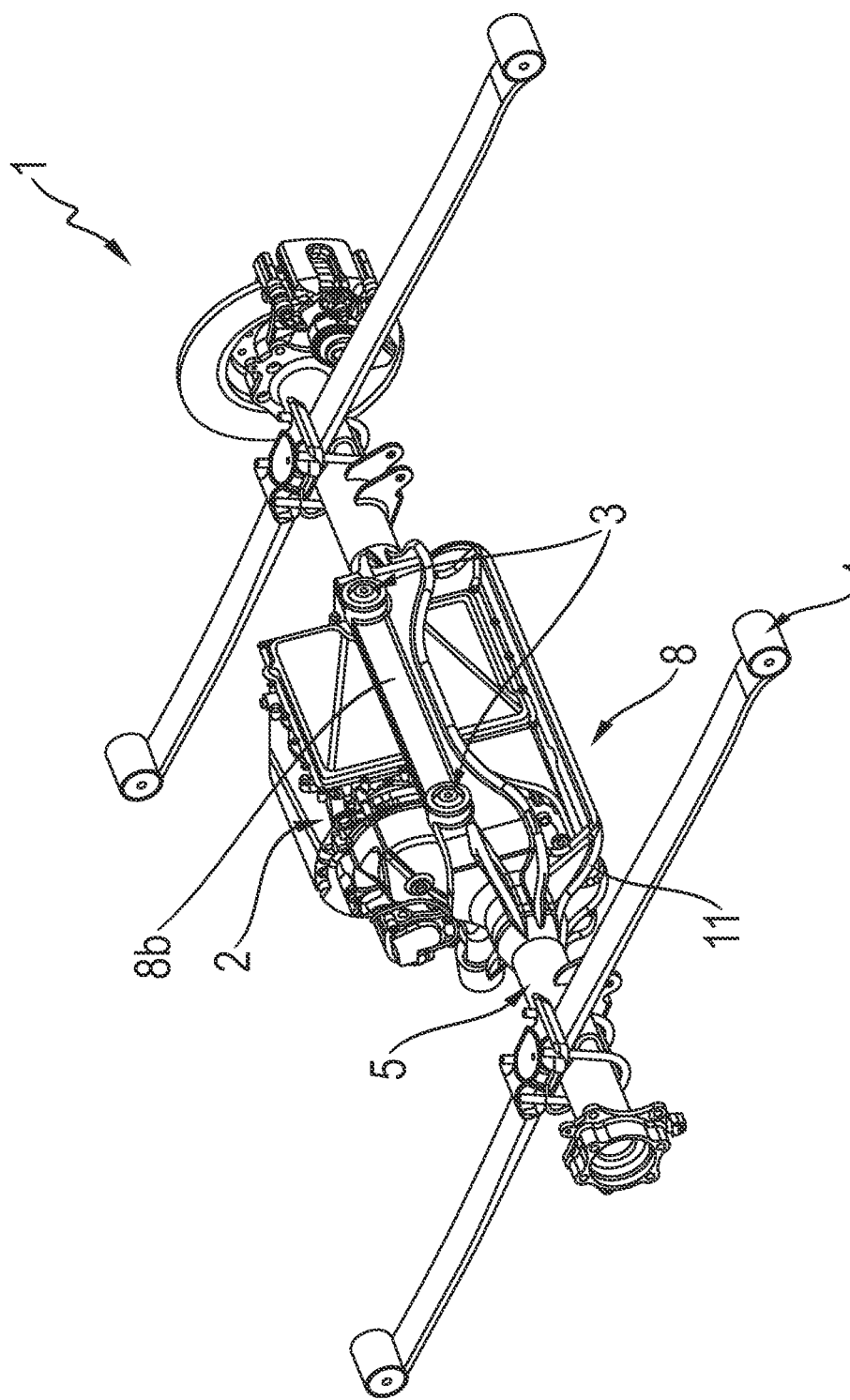
FIG. 3: A drivable axle with a drive unit according to an embodiment of the present invention.
Figure 4:
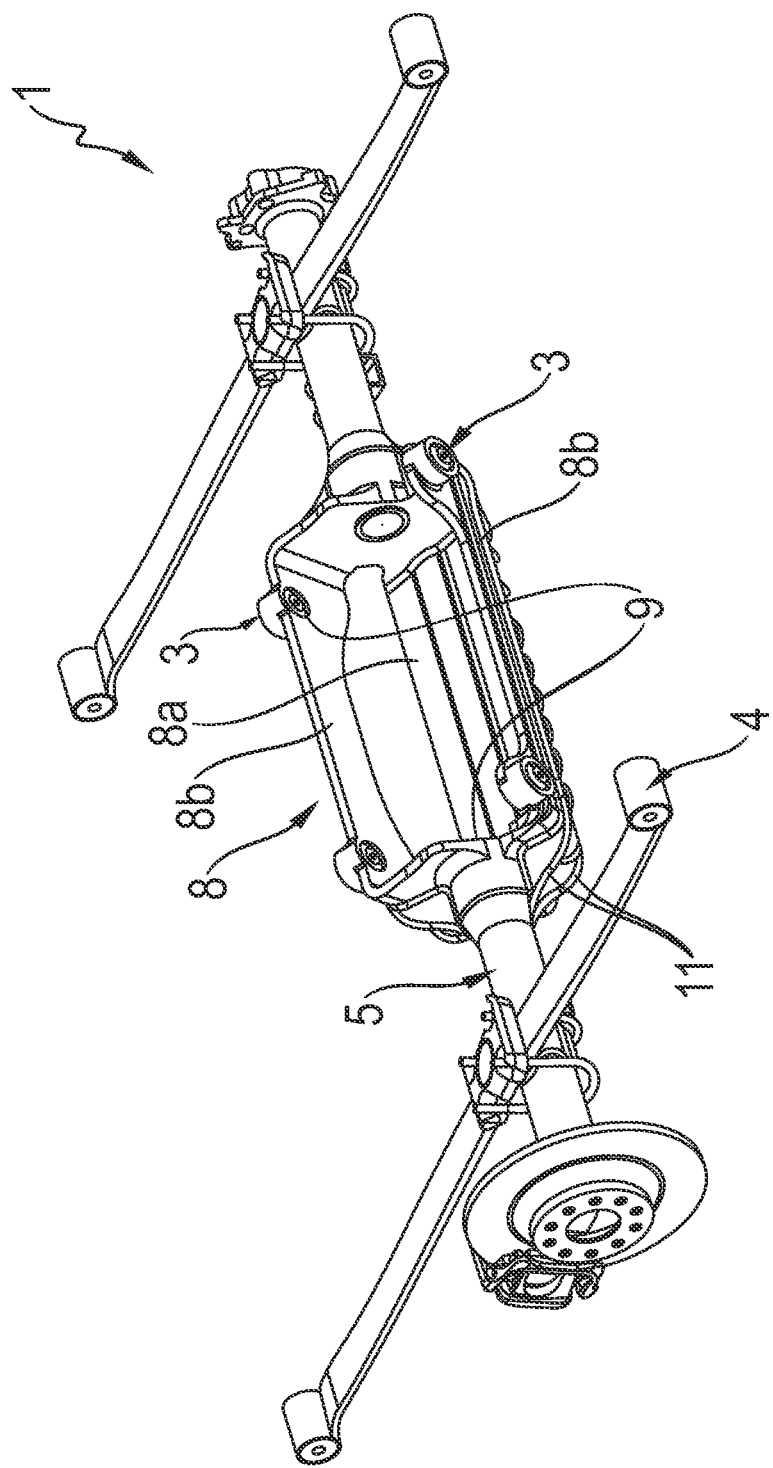
FIG. 4: The drivable axle according to FIG. 3 without its drive unit.

In FIG. 3 a drivable axle with a drive unit according to an embodiment of the present invention is shown, and in FIG. 4 the drivable axle according to FIG. 3 is shown without the drive unit of FIG. 3.

In detail, FIGS. 3 and 4 show a drivable axle 1 as in FIGS. 1 and 2. As in the case of the drivable axle 1 in FIGS. 1 and 2, the drivable axle 1 according to FIGS. 3 and 4 comprises a receiving structure 8 with an essentially flat bottom area 8a. Instead of the detachably arranged bracket 6, in this case in addition to the already present sidewalls a further sidewall is provided; thus, the receiving structure 8 according to FIGS. 3 and 4 now has two sidewalls 8b, which extend parallel to the axis of the axle body 5. In this case, these extend perpendicularly to the axle body 5, but are longer or higher than the sidewalls 8b of the drivable axle 1 according to FIGS. 1 and 2. In other words, in the embodiment according to FIGS. 3 and 4 an electric motor is arranged "deeper" inside the receiving structure 8, which enables it to be fixed even more reliably. In particular the sidewalls 8b are designed such that the electric motor 2, in its extension perpendicular to the axle body 5, is essentially surrounded over at least half its length by the receiving structure 8. In this case the sidewalls 8b are formed by struts or by large openings that extend over the full axial length in the two sidewalls 8b. This results in savings of material and therefore costs. In that respect the receiving structure 8 of FIGS. 3 and 4 forms a three-sided retainer.

As a whole, the receiving structure 8 of FIGS. 3 and 4 is made integrally, as one piece. As also in FIGS. 1 and 2, the receiving structure 8 has stiffening ribs 11 which are of convex shape. Likewise, the receiving structure 8 can preferably be provided with damping elements, particularly in the form of soft and/or hard rubber mountings, in its four screwing areas 3 arranged symmetrically on the receiving structure 8.

In summery, at least one of the embodiments of the invention has at least one of the following advantages:
simple implementation
inexpensive implementation
smaller fitting space occupancy
low weight
reduced noise emission.

Although the present invention has been described with reference to preferred example embodiments, it is not limited thereto but rather, can be modified in many ways.

INDEXES

1 Drivable axle
2 Drive unit
3 Fixing area
4 Leaf spring
5 Axle body
6 Fixing element
7 Screw joint
8 Receiving structure
8a Bottom area
8b Sidewall
9 Openings
10 Damping element
11 Stiffening element

The invention claimed is:

1. A drivable axle for a vehicle comprising:
an axle body being configured to receive an axle shaft, and
a receiving structure for receiving a vehicle element for integration into a drive-train,
the receiving structure being connected to the axle body,
the receiving structure being configured to receive a drive unit of the vehicle and having openings for connection to the axle shaft, and the receiving structure has at least one open side such that an interior of the receiving structure is accessible through the open side from an exterior of the receiving structure,
the receiving structure having at least one fixing area for fixing the drive unit to the receiving structure, and
the drivable axle comprises a spring device for a sprung suspension of the vehicle.

2. The drivable axle according to claim 1, wherein the receiving structure is arranged substantially symmetrically relative to the axle body.

3. The drivable axle according to claim 1, wherein the receiving structure is connected to the axle body with at least one of interlock and by friction force.

4. The drivable axle according to claim 1, wherein the fixing area comprises at least one damping element.

5. The drivable axle according to claim 1, wherein a fixing element is provided for an additional interlocked connection of the receiving structure with the drive unit, in order to further secure the drive unit to the axle shaft.

6. The drivable axle according to claim 5, wherein the fixing element is in a form of a U-shaped bracket.

7. The drivable axle according to claim 5, wherein the fixing element is detachably connected to the receiving structure.

8. The drivable axle according to claim 1, wherein the receiving structure is essentially of a trough-shaped form.

9. The drivable axle according to claim 1, wherein the spring device comprises one or more leaf springs.

10. The drivable axle according to claim 1, wherein the receiving structure is configured to receive an electric motor such that when the electric motor is fixed to the receiving structure the electric motor extends through the open side.

11. The drivable axle according to claim 1, wherein the fixing area comprises at least one screwing element for securing the drive unit to the receiving structure.

12. A drive mechanism for a vehicle comprising:
a drivable axle according to claim 1, and
a drive unit which is connected to the receiving structure of the drivable axle in order to drive the vehicle.

13. The drive mechanism according to claim 12, wherein the drive unit is an electric motor.

14. A drivable axle for a vehicle comprising:
an axle body being configured to receive an axle shaft, and
a receiving structure for receiving a vehicle element for integration into a drive-train,
the receiving structure being connected to the axle body,
the receiving structure being configured to receive a drive unit of the vehicle and having openings for connection to the axle shaft, and
the receiving structure having at least one fixing area for fixing the drive unit to the receiving structure the receiving structure has at least one stiffening rib, and
the at least one stiffening rib either
extends both parallel and perpendicular to the axle body, or
is essentially star shaped.

15. The drivable axle according to claim 14, wherein the at least one stiffening rib extends both parallel and perpendicular to the axle body.

16. The drivable axle according to claim 14, wherein the at least one stiffening rib is essentially star shaped.

17. The drivable axle according to claim 14, wherein
the receiving structure receiving the drive unit of the drive-train of the vehicle therein,
the receiving structure being trough shaped and having an open side to facilitate access to an interior of the receiving structure and axially opposite openings to facilitate connection between the axle shaft and the drive unit;
the receiving structure being rigidly secured to the axle body; and
the drive unit being releasably fixed, via the at least one fixing area, to the receiving structure.

\* \* \* \* \*